(12) United States Patent
Mudel

(10) Patent No.: US 8,206,133 B2
(45) Date of Patent: Jun. 26, 2012

(54) TURBOCHARGER HOUSING WITH INTEGRAL INLET AND OUTLET OPENINGS

(75) Inventor: Roman Mudel, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 971 days.

(21) Appl. No.: 12/189,867

(22) Filed: Aug. 12, 2008

(65) Prior Publication Data

US 2010/0040467 A1 Feb. 18, 2010

(51) Int. Cl.
*F02C 6/12* (2006.01)
*F02B 37/013* (2006.01)

(52) U.S. Cl. .......................................... 417/406; 60/612

(58) Field of Classification Search .......... 417/405–409; 60/605.2, 612; 123/568.11–568.21
See application file for complete search history.

(56) References Cited

U.S. PATENT DOCUMENTS

| | | | |
|---|---|---|---|
| 4,075,849 A | 2/1978 | Richardson | |
| 4,294,073 A | 10/1981 | Neff | |
| 4,304,097 A | 12/1981 | Kondo et al. | |
| 4,611,465 A | 9/1986 | Kato et al. | |
| 5,046,317 A | 9/1991 | Satokawa | |
| 5,579,643 A | 12/1996 | McEwen et al. | |
| 6,000,222 A | 12/1999 | Regnier | |
| 6,050,095 A | 4/2000 | Blake | |
| 6,263,672 B1 * | 7/2001 | Roby et al. | 60/605.2 |
| 6,381,960 B1 | 5/2002 | Mardberg | |
| 6,430,929 B2 * | 8/2002 | Martin | 60/605.2 |
| 6,571,782 B2 | 6/2003 | Brosseau et al. | |
| 6,766,645 B2 | 7/2004 | Zimmer et al. | |
| 6,772,742 B2 | 8/2004 | Lei et al. | |
| 6,931,849 B2 | 8/2005 | Parker | |
| 6,945,046 B2 | 9/2005 | Allmang et al. | |
| 6,945,048 B2 | 9/2005 | Whiting | |
| 6,978,615 B2 | 12/2005 | Jones et al. | |
| 7,043,913 B2 | 5/2006 | Nishiyama et al. | |
| 7,198,459 B2 | 4/2007 | Grussmann et al. | |
| 7,234,302 B2 | 6/2007 | Korner | |
| 7,240,892 B2 | 7/2007 | Battig | |
| 7,290,392 B2 | 11/2007 | Jones | |
| 7,302,800 B2 * | 12/2007 | Klingel | 60/612 |
| 7,340,895 B2 | 3/2008 | Noelle | |
| 2004/0244372 A1 | 12/2004 | Leavesley | |
| 2005/0050888 A1 | 3/2005 | McEwan | |
| 2005/0257521 A1 | 11/2005 | Anello | |
| 2007/0283698 A1 | 12/2007 | Chen | |

FOREIGN PATENT DOCUMENTS

| | | |
|---|---|---|
| CN | 1408053 A | 4/2003 |
| JP | 54148927 A | 11/1979 |
| JP | 58117322 A | 12/1983 |
| JP | 59203821 A | 11/1984 |

* cited by examiner

Primary Examiner — Calvin Lee
(74) Attorney, Agent, or Firm — Cantor Colburn LLP

(57) ABSTRACT

Exemplary embodiments of the present invention are directed towards a turbocharger for an internal combustion engine and more particularly an apparatus and method for fluidly coupling a turbocharger with an internal combustion engine. In one embodiment a turbocharger housing is provided. Turbocharger housing includes a turbine housing defining a volute chamber. The turbocharger housing also includes a first housing support extending from the turbine housing. The first housing support is integrally formed with the turbine housing and the first housing support defines an inlet opening and an outlet opening each of which are in fluid communication with the volute chamber.

9 Claims, 4 Drawing Sheets

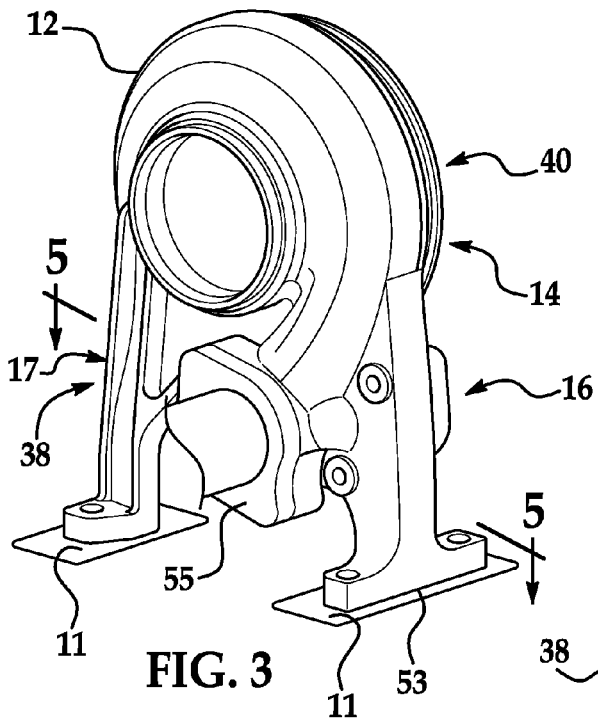
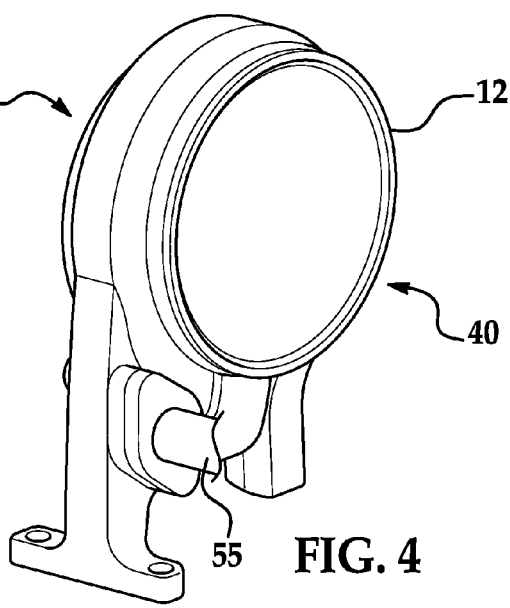
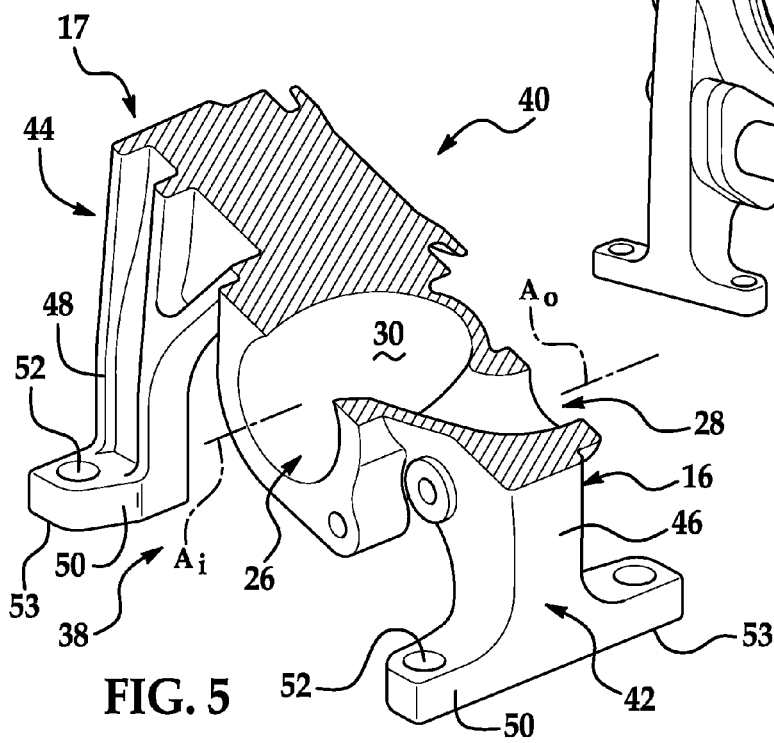
FIG. 3
FIG. 4
FIG. 5

TURBOCHARGER HOUSING WITH INTEGRAL INLET AND OUTLET OPENINGS

FIELD OF THE INVENTION

Exemplary embodiments of the present invention are directed towards a turbocharger for an internal combustion engine and more particularly an apparatus and method for fluidly coupling a turbocharger with an internal combustion engine.

BACKGROUND

Turbochargers are used with internal combustion engines for providing improved performance. In doing so, the turbochargers supply compressed air to an air intake system of the engine. Typically, turbochargers obtain their energy through the utilization of exhaust gas that is expelled from the engine. The exhaust gas is routed into a turbine that is connected by a shaft to a compressor. The exhaust from the engine spins the turbine and associated compressor which pumps air into the engine intake system.

Turbochargers are typically mounted to a component of an engine, such as an exhaust manifold, and are fluidly coupled to the exhaust system and air intake system of the engine. Often an engine will include a fluid coupling located between the engine and the turbocharger for fluidly coupling the exhaust system with an exhaust gas recirculation (EGR) device. In another arrangement, a fluid coupling for the EGR is located in the turbine housing volute of the turbocharger. However, these arrangements have proven to be less than desirable. Accordingly, it is desirable to provide an improved method and device for fluidly connecting a turbocharger and EGR system to air intake components of the engine.

SUMMARY OF THE INVENTION

In one embodiment a turbocharger housing is provided. Turbocharger housing includes a turbine housing defining a volute chamber. The turbocharger housing also includes a first housing support extending from the turbine housing. The first housing support is integrally formed with the turbine housing and the first housing support defines an inlet opening and an outlet opening each of which are in fluid communication with the volute chamber.

In yet another embodiment, a method of providing an exhaust inlet opening and an exhaust outlet opening for a volute chamber of a turbocharger housing is provided. The method includes locating a fluid inlet opening of the turbocharger housing in a first housing support of the turbocharger housing. The first housing support is integrally formed with the turbocharger housing and extends from a turbine housing defining the volute chamber. The fluid inlet opening is in fluid communication with the volute chamber through an exhaust passage extending though the first housing support. The method further includes locating a fluid outlet opening of the turbocharger housing in the first housing support of the turbocharger housing. The fluid outlet opening is in fluid communication with the volute chamber through the exhaust passage extending though the first housing support.

BRIEF DESCRIPTION OF THE DRAWINGS

Other features, advantages and details appear, by way of example only, in the following description of embodiments, the description referring to the drawings in which:

FIG. 3 is a perspective view of a turbine housing in accordance with an exemplary embodiment of the present invention;

FIG. 4 is another perspective view of the turbine housing shown in FIG. 3;

FIG. 5 is a cross-sectional view taken along lines 5-5 of FIG. 3;

DESCRIPTION OF THE EMBODIMENTS

Figure 1:
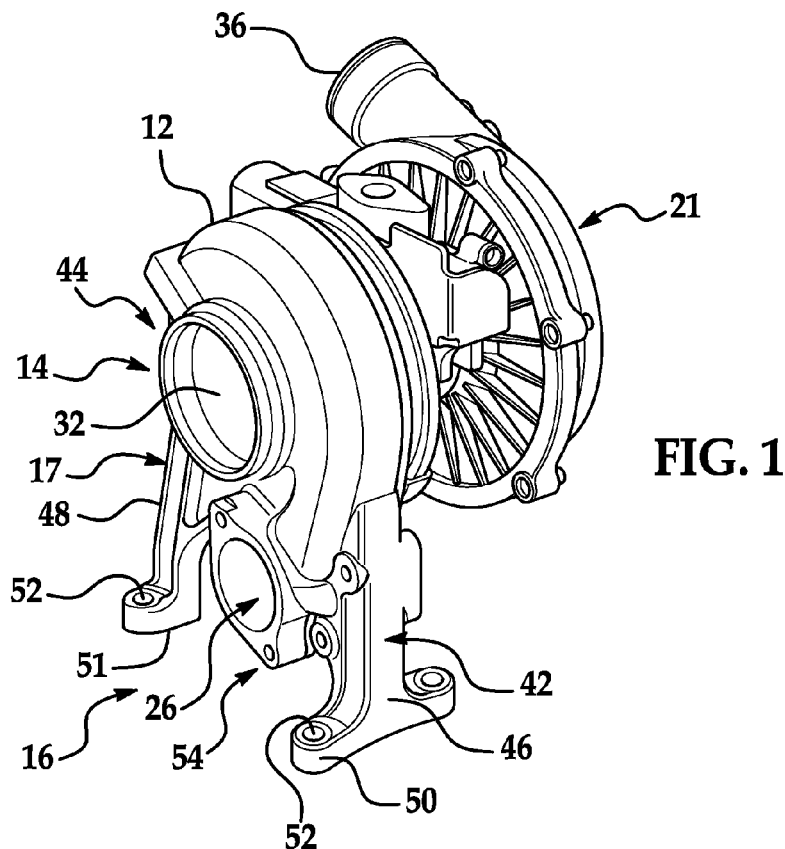
FIG. 1 is a perspective view of a turbocharger housing in accordance with an exemplary embodiment of the present invention.
Figure 2:
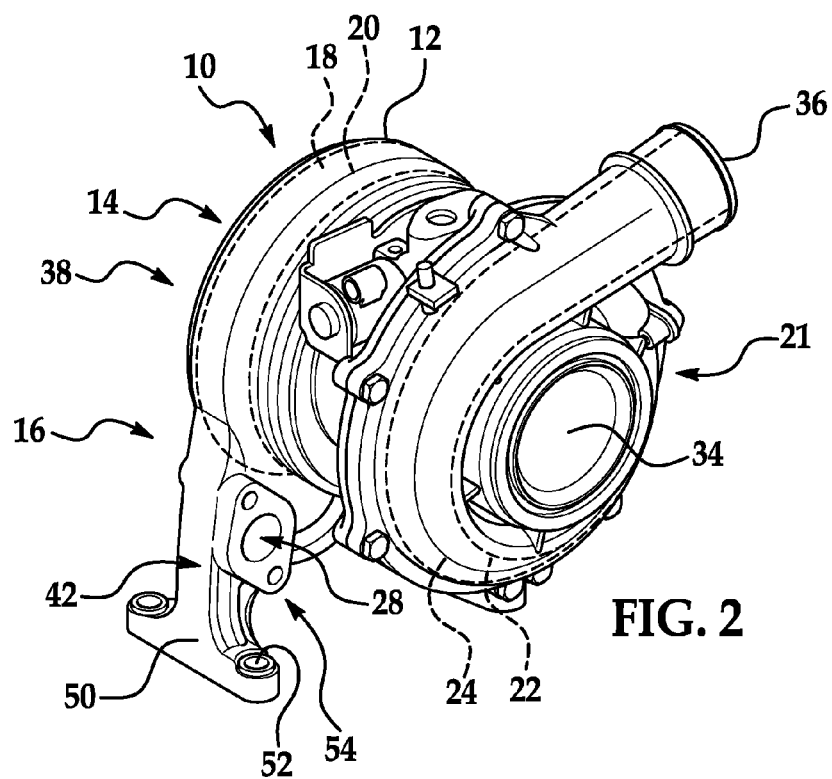
FIG. 2 is another perspective view of the turbocharger housing shown in FIG. 1.

Referring now to FIGS. 1 and 2, a turbocharger assembly 10 is illustrated. The turbocharger assembly includes a housing 12 having a turbine housing 14, a first housing support 16 and a second housing support 17. The turbine housing 14 defines a first volute chamber 18 for receiving an exhaust turbine rotor 20. The housing 12 further includes a compressor housing 21 defining a second volute chamber 22 for receiving a compressor rotor 24. The exhaust turbine rotor and the compressor rotor are connected to each other by a shaft (not shown), which allows rotation of the exhaust turbine and compressor rotor.

The first and second housing supports 16, 17 are configured for supporting components of the turbocharger assembly 10 and attachment of the turbocharger assembly 10 to a structure of an engine 11, see FIG. 3. The first housing support 16 defines an inlet opening 26 adapted to be fluidly coupled to an exhaust supply of the engine and an outlet opening 28 adapted to be fluidly coupled to another exhaust component of an engine, such as an exhaust gas recirculation (EGR) device. Fluid coupling of the inlet opening and the outlet opening is achieved through connector 54. The inlet and outlet openings fluidly communicate with one another through exhaust passage 30, see FIG. 5, formed within the first housing support 16. The first housing support is in further fluid communication with the first volute chamber 18 also through exhaust passage 30, see FIG. 8. Accordingly, the exhaust passage forms a first flow path 'F1' from the inlet opening 26 to the outlet opening 28 and forms a second flow path 'F2' the inlet opening 26 to the first volute chamber 18.

Figure 6:
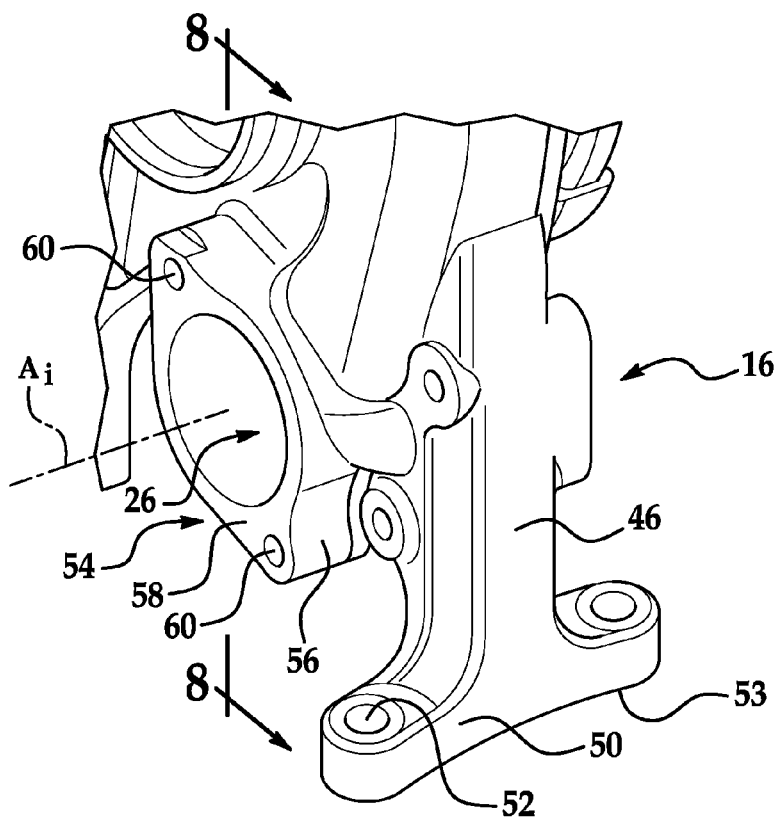
FIG. 6 is a partial enlarged view of the turbine housing shown in FIG. 1.
Figure 8:
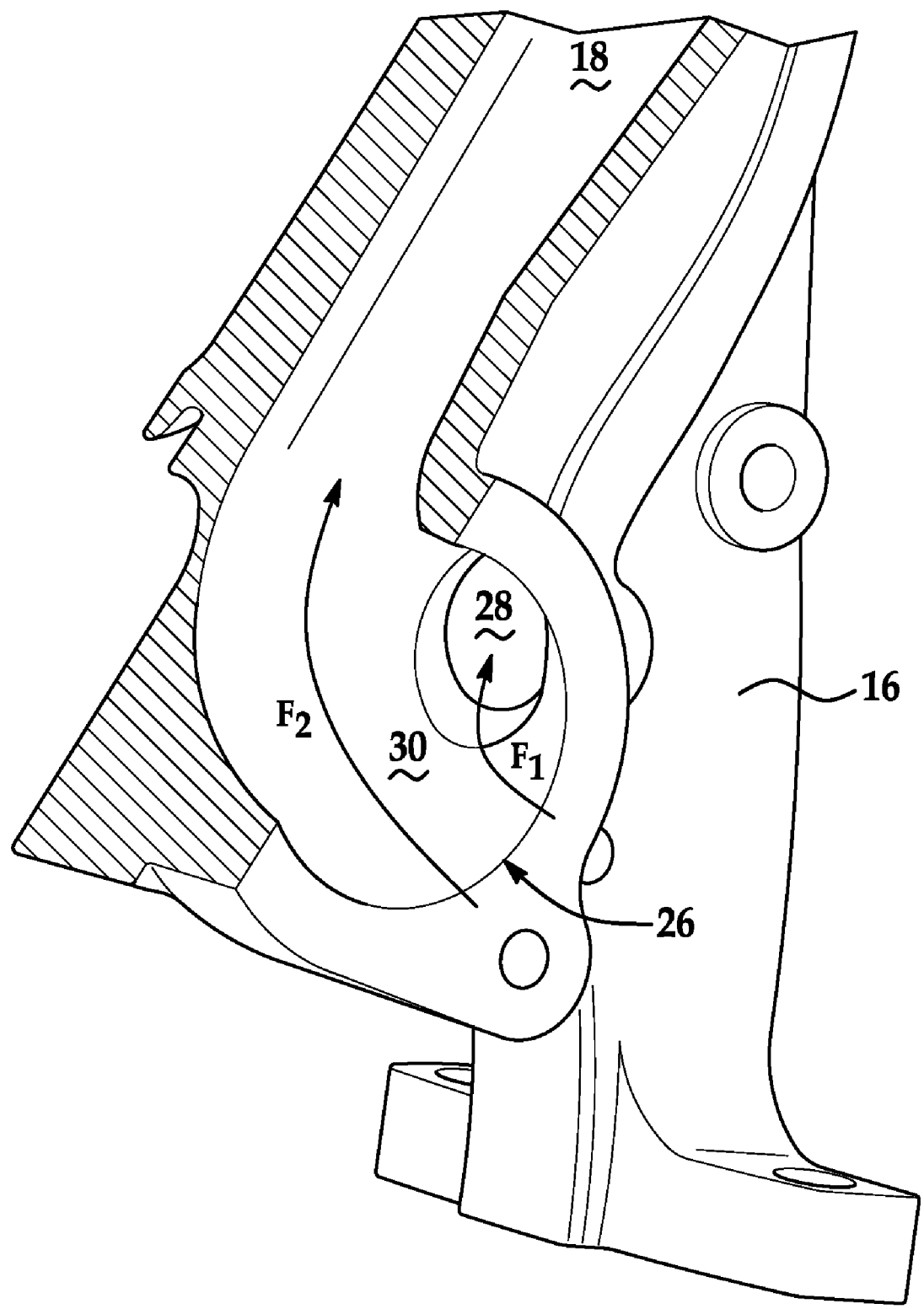
FIG. 8 is a cross-sectional view taken along lines 8-8 of FIG. 6.

In operation, referring to FIGS. 6 and 8, exhaust gas is received within exhaust passage 30 through inlet opening 26. The exhaust gas is diverted, in part, to first volute chamber 18, through flow path F1, and to an EGR device through flow path F2. Exhaust gas traveling to first volute chamber 18 engages blades associated with exhaust turbine rotor 20 causing rotation of the exhaust turbine rotor and hence compressor rotor 24. The exhaust gas engaging the blades of the exhaust turbine rotor then exits the turbine housing through an exhaust port 32 to further travel along an exhaust system (not shown) of the engine. Due to the rotation of the compressor rotor, blades associated with the compressor rotor draw air into the second volute chamber 22 through an inlet port 34. The air drawn through the inlet port exits the turbocharger through a compression port 36.

With respect to exterior shape of the turbine housing 14 and first and second housing support 16, 18, referring to FIGS.

3-5, the turbine housing and housing supports include a first side 38 and an oppositely located second side 40. Located on the sides of the turbine housing and housing supports are oppositely located edge portions 42, 44 and in one non-limiting embodiment, the first and second sides 38, 40 are generally perpendicular to edge portions 42, 44.

With respect to first and second housing supports 16, 17 the housing supports are configured for providing support to the turbocharger assembly 10 and for mounting the turbocharger assembly to a structure such as an engine or component thereof. In one embodiment, referring to FIGS. 6 and 7, the first and second housing supports 16, 17 comprise a pair of legs extending from the turbine housing 14 and along the edge portions 42, 44 of the turbine housing. Other configurations are possible. For example, the first and second housing support may be combined into a single housing support forming a single leg. Also, more than two housing supports and legs may be formed.

The first and second housing supports 16, 17 include one or more mounting features for attachment of the turbocharger housing 12 to a structure, such as an engine 11. In one configuration, the one or more mounting features comprise one or more flanges extending from the first and second housing supports 16, 17. For example, referring to FIGS. 3, 6 and 7, the first housing support 16 includes a first mounting flange 50 extending from the first side 38 of the turbine housing 14 and the second side 40 of the turbine housing. The second housing support 17 includes a second mounting flange 51 extending from the first side 38 of the turbine housing. It should be appreciated that other flange configurations are possible and within the scope of the present invention.

The mounting flanges 50, 51 extending from the first and second housing supports 16, 17 include one or more openings 52 for attachment of the flange and hence the turbocharger assembly 10 to the engine 11. The openings are configured for receiving or engaging a mechanical fastener, such as a bolt, for securing the turbocharger assembly to the engine. Also, in one exemplary embodiment, the first and second mounting flange 50, 51 includes a mounting surface 53 having a surface profile corresponding to the structural component in which it engages. Such mounting surface may extend between a first side and a second side of the turbine housing 14.

With respect to engine components, the turbocharger assembly may be attached to an engine block, cylinder head, intake or exhaust manifold, or other engine components. Alternately, the turbocharger assembly may be attached to a non-engine component such as a frame member (e.g., vehicle frame or otherwise), panel member, or otherwise.

Figure 7:
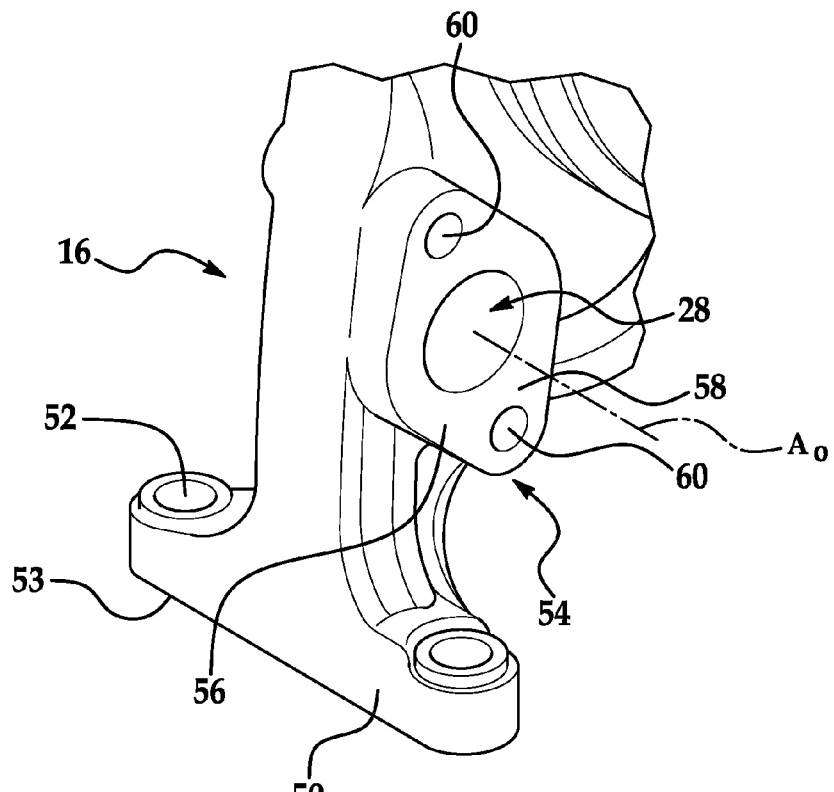
FIG. 7 is a partial enlarged view of the turbine housing shown in FIG. 2.

The first housing support 16 further includes one or more inlet openings 26 and one or more outlet openings 28. As previously mentioned the inlet and outlet openings are configured to receive fluid flow therethrough and are in fluid communication with the exhaust passage 30. As shown in FIGS. 5-7, inlet opening 26 is formed on the first side 38 of the first housing support 16 and includes a generally cylindrical inlet passageway having an inlet axis $A_i$. Outlet opening 28 is formed on the second side 40 of first housing support 16 and includes a generally cylindrical outlet passageway having an outlet axis $A_o$. In one configuration, the inlet axis and the outlet axis are through the center of the inlet and outlet openings. In yet another configuration, the inlet axis and the outlet axis are through another portion of the openings. In one embodiment, the inlet and outlet axes are parallel to one another. In another embodiment, the inlet and outlet axes intersect one another. In still another embodiment, the inlet opening and the outlet opening are aligned in an overlapping relationship when viewed from a first or second side 38, 40 of the turbine housing 14.

As previously mentioned, the inlet opening and outlet opening 26, 28 are in fluid communication with exhaust passage 30 formed by the first housing support. In order to provide proper fluid flow, the exhaust passage includes a suitable cross-sectional area to maintain suitable fluid pressure and flow to the first volute chamber 18 as well as outlet opening 28. For example, it is contemplated that the cross-sectional area of the exhaust passage 30 (e.g., first flow path F1, second flow path F2 or both) is generally equal to the opening area of the inlet opening 26. However, in an alternative embodiment, the cross-sectional area of the exhaust passage is more or less than the cross-sectional area of the open area of the inlet opening to modify the flow characteristics (e.g., velocity), flow pattern (e.g., laminar, turbulent or transitional) or otherwise.

As previously mentioned, the inlet opening and outlet openings 26, 28 include connectors 54 for attachment to a corresponding fluid component, such as an exhaust component, EGR device or otherwise. In the embodiment shown in FIGS. 3, 4, 6 and 7, the one or more connectors 54 include a flange 56 having a mating surface 58 for engagement with a corresponding fluid component 55. Advantageously, the attachment is further enhanced by a sealing feature (e.g., gasket, sealant material, adhesive, etc.) disposed between the matting surface 58 of flange 56 and corresponding fluid component 55. As such, the flange includes an attachment feature for facilitating the same. As with the mounting flange, in one non-limiting embodiment, the attachment feature comprises one or more mechanical fasteners (e.g., bolts) adapted to extend through openings of the corresponding component to engage threads formed within openings 60 of the flange 56.

The turbocharger housing 12 may be formed of any suitable material capable of withstanding high temperatures associated with engines as well as providing the desired structural support. Similarly, the turbocharger housing may be formed by any suitable means (e.g., casting, molding, injection molding, etc.) and may be further machined as necessary. The material forming the turbocharger housing may comprise a metal, metal alloy, ceramic, combinations thereof, or any other suitable material. In one embodiment, the material forming the turbocharger housing comprises or includes a cast iron, such as high temperature cast iron. In another embodiment, the material forming the turbocharger housing comprises or includes cast silicon-molybdenum irons (Si—Mo irons).

In another embodiment, a method of providing an exhaust inlet opening 26 and an exhaust outlet opening 28 for a turbine housing 14 is provided. The method includes locating a fluid inlet opening 26 in a first housing support 16 of the turbocharger housing 12. The first support portion is integrally formed with the turbine housing 14 and extends from a portion of the turbine housing defining a first volute chamber 18 of the turbocharger housing. The fluid inlet opening is in fluid communication with the first volute chamber through exhaust passage 30 extending though the first housing support. The method further includes locating a fluid outlet opening 28 of the turbine housing 14 in the first housing support 16 of the turbocharger housing 12. The fluid outlet opening is in fluid communication with the first volute chamber 18 through exhaust passage 30 extending though the first housing support. In one embodiment, the inlet opening 26 is disposed on a first side 38 of the first housing support and the outlet opening 28 is disposed on a second side 40 of the first housing support. In one particular embodiment, the inlet opening 26 is aligned with the outlet opening 28 and the first side 38 of the first housing support 16 opposes the second side of the first housing support, wherein an axis of the inlet opening $A_i$ is aligned with an axis of the outlet opening $A_o$. The method further contemplates the turbocharger housing 12 including a second housing support 17 extending from the first volute chamber and being integrally formed with the turbine housing 14. The first housing support 16 and the second housing support 17 provide a pair of mounting surfaces 53 for mounting the turbocharger housing 12 to an engine 11.

As described above, the turbocharger housing 12 provides an improved device and method for incorporating a turbocharger with an engine. As should be appreciated, the devices and methods herein may be used in many different non-limiting engine applications. For example, the devices and methods may be used with a stand-alone engine such as a power generating engine, compressor engine, or otherwise. Of course, the devices and methods may be used in vehicle applications including automotive, aircraft, marine, railway, etc.

The aforementioned embodiments improve and simplify integration of a turbocharger with an engine. The unitary housing structure provides a compact design by incorporating an exhaust gas inlet and an EGR outlet with the turbine housing of a turbocharger by including them in a support portion of the turbocharger housing. Also, the unitary turbine housing structure integrates a turbine housing with a housing support having the exhaust gas inlet and the EGR outlet to form a unitary structure. This integration eliminates the need for additional fluid connections between the turbocharger housing and the engine to fluidly couple the engine to an EGR. Further, the number of separate fluid connectors (e.g., flange or otherwise) is reduced through the incorporation of fluid connectors with the turbine housing of the turbocharger. Also, the elimination of upstream EGR connectors reduces the required volume rate of exhaust gas to the turbocharger, which improves engine performance and lowers the restriction of the EGR system.

While exemplary embodiments have been described and shown, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A turbocharger housing, comprising:
a turbine housing defining a volute chamber;
a first housing support extending from the turbine housing and a mounting flange configured for mounting the turbine housing to an engine, the first housing support being integrally formed with the turbine housing, the first housing support defining an inlet opening, an outlet opening and an exhaust passage, the exhaust passage fluidly connecting the inlet opening to the outlet opening and the inlet opening to the volute chamber, the mounting flange spaced from the inlet opening and the outlet opening; and
a second housing support extending from and being integrally formed with the turbine housing, the first housing support and the second housing support providing a pair of mounting surfaces for mounting the turbine housing to a structure.

2. The turbocharger housing as in claim 1, wherein the inlet opening is disposed on a first side of the first housing support and the outlet opening is disposed on a second side of the first housing support.

3. The turbocharger housing as in claim 2, wherein the inlet opening is axially aligned with the outlet opening.

4. The turbocharger housing as in claim 2, wherein the first side of the first housing support opposes the second side of the first housing support.

5. The turbocharger housing as in claim 4, wherein the inlet opening is axially aligned with the outlet opening.

6. The turbocharger housing as in claim 1, wherein a center axis of the inlet opening is aligned with a center axis of the outlet opening.

7. The turbocharger housing as in claim 1, wherein the inlet opening is an exhaust gas inlet opening and the outlet opening is an exhaust gas outlet opening.

8. The turbocharger housing as in claim 1, further comprising a second housing support extending from the turbine housing, the second housing support being integrally formed with the turbine housing, the first housing support and the second housing support provide a pair of mounting surfaces for mounting the turbine housing to a structure and wherein the inlet opening is disposed on a first side of the first housing support and the outlet opening is disposed on a second side of the first housing support and one of the pair of mounting surfaces is disposed between the first side of the first housing support and the second side of the first housing support.

9. The turbocharger housing as in claim 8, wherein the inlet opening is axially aligned with the outlet opening and the first side of the first housing support opposes the second side of the first housing support.

\* \* \* \* \*